US008385750B2

(12) United States Patent
Fukao et al.

(10) Patent No.: US 8,385,750 B2
(45) Date of Patent: Feb. 26, 2013

(54) OPTICAL TRANSMISSION DEVICE

(75) Inventors: Tetsuhiro Fukao, Tokyo (JP); Harufusa Kondo, Tokyo (JP); Kenichi Uto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 875 days.

(21) Appl. No.: 12/464,174

(22) Filed: May 12, 2009

(65) Prior Publication Data

US 2010/0150578 A1   Jun. 17, 2010

(30) Foreign Application Priority Data

Dec. 17, 2008 (JP) ................................. 2008-321201

(51) Int. Cl.
*H04B 10/04* (2006.01)
(52) U.S. Cl. ......... 398/196; 398/195; 398/192; 398/182
(58) Field of Classification Search .................. 398/196, 398/195, 192, 182
See application file for complete search history.

(56) References Cited

U.S. PATENT DOCUMENTS

| 7,460,572 B2 * | 12/2008 | Kawai et al. ............... 372/29.02 |
| 2005/0244161 A1 | 11/2005 | Satoh |
| 2006/0018659 A1 * | 1/2006 | Sekine et al. ................... 398/79 |
| 2007/0047603 A1 * | 3/2007 | Oomori ........................... 372/34 |

FOREIGN PATENT DOCUMENTS

| JP | 11-098122 A | 4/1999 |
| JP | 11-251674 A | 9/1999 |
| JP | 2005-341529 A | 12/2005 |
| JP | 2006-033581 A | 2/2006 |
| JP | 2007-059537 A | 3/2007 |
| WO | WO 2004/102754 A1 | 11/2004 |

OTHER PUBLICATIONS

State Intellectual Property Office of the People's Republic of China; Office Action in Chinese Patent Application No. 200910167035.3 (Jul. 2, 2012).
State Intellectual Property Office of the People'S Republic of China, Office Action in Chinese Patent Application No. 200910167035.3 (Dec. 11, 2012).

* cited by examiner

*Primary Examiner* — Kinam Park
(74) *Attorney, Agent, or Firm* — Leydig, Voit & Mayer, Ltd.

(57) ABSTRACT

An optical transceiver includes an optical transmitter. The optical transmitter varies the wavelength of its output beam in accordance with the setting of a digital to analog converter. Two split beams emerging respectively from beam splitters are introduced into a photodetector and a wavelength filter, respectively. A quotient is calculated by dividing the digital value output from an analog to digital converter (ADC) by the digital value output from another ADC. A memory address m is then determined based on this quotient without making any calculation for compensating for the imperfect characteristics of the wavelength filter. A wavelength notification value is then selected from a wavelength notification table based on the determined memory address m, and sent to the system host.

16 Claims, 8 Drawing Sheets

| quotient | Memory Address m | Wevelength setting table<br>DAC control value | Wevelength notification table<br>Wevelength notification value |
|---|---|---|---|
| D1 | 0 | DA0 | W10 |
| D2 | 1 | DA1 | W11 |
| D3 | 2 | DA2 | W12 |
| ... | ... | ... | ... |
| Dn | n | DAn | W1n |

| Wave-length | Memory Address m | DAC value |
|---|---|---|
| W10 | 0 | DA0 |
| W11 | 1 | DA1 |
| W12 | 2 | DA2 |
| ... | ... | ... |
| W1n | n | DAn |

Control/Wavelength-Notification table of a wavelength k0

| quotient | Memory Address | Wavelength setting table<br>DAC control value | Wavelength notification table<br>Wavelength notification value |
|---|---|---|---|
| D00 | (0, 0) | DA00 | W100 |
| D01 | (0, 1) | DA01 | W101 |
| D02 | (0, 2) | DA02 | W102 |
| ... | ... | ... | ... |
| D0n | (0, n) | DA0n | W10n |

Control/Wavelength-Notification table of a wavelength k1

| quotient | Memory Address | DAC control value | Wavelength notification value |
|---|---|---|---|
| D10 | (1, 0) | DA10 | W110 |
| D11 | (1, 1) | DA11 | W111 |
| D12 | (1, 2) | DA12 | W112 |
| ... | ... | ... | ... |
| D1n | (1, n) | DA1n | W11n |

Control/Wavelength-Notification table of a wavelength k2

| quotient | Memory Address | DAC control value | Wavelength notification value |
|---|---|---|---|
| D20 | (2, 0) | DA20 | W120 |
| D21 | (2, 1) | DA21 | W121 |
| D22 | (2, 2) | DA22 | W122 |
| ... | ... | ... | ... |
| D2n | (2, n) | DA2n | W12n |

⋮

Control/Wavelength-Notification table of a wavelength km

| quotient | Memory Address | DAC control value | Wavelength notification value |
|---|---|---|---|
| Dm0 | (m, 0) | DAm0 | W1m0 |
| Dm1 | (m, 1) | DAm1 | W1m1 |
| Dm2 | (m, 2) | DAm2 | W1m2 |
| ... | ... | ... | ... |
| Dmn | (m, n) | DAmn | W1mn |

|  |  | Temperature setting table | Temperature notification table |
|---|---|---|---|
| ADC value | Memory Address | Temperature control value | Temperature notification value |
| D0 | 0 | TDA0 | T0 |
| D1 | 1 | TDA1 | T1 |
| D2 | 2 | TDA2 | T2 |
| ... | ... | ... | ... |
| Dn | n | TDAn | Tn |

OPTICAL TRANSMISSION DEVICE

BACKGROUND OF THE INVENTION

1. Field of the Invention

The present invention relates to an optical transmission device for use in optical communications.

2. Background Art

Various techniques are known for optical communications using optical transmitters and receivers, as disclosed, e.g., in Japanese Laid-Open Patent Publication Nos. 11-098122 (1999), 11-251674 (1999), 2007-059537, 2006-033581, and 2005-341529 and Japanese Domestic Republication of International Patent Application No. WO 2004/102754. The combination of an optical transmitter and receiver is generally referred to as an optical transceiver (or OTR).

An optical transmitter includes a modulator and a semiconductor laser to modulate an electrical signal onto an optical signal. The wavelength of the output beam (hereinafter also referred to as the "output wavelength" for convenience) of the optical transmitter need be accurately controlled to provide high-quality optical communications. Since optical communications systems using wavelength division multiplexing (WDM) each transmit information on different wavelengths of light simultaneously, it is especially important that these systems adjust the output beam of each optical transmitter to the desired wavelengths, i.e., perform an accurate wavelength control. It should be noted that the wavelength control of the output beam is more important with dense WDM (or DWDM), since this technology uses more closely spaced wavelengths than WDM.

When it is necessary to control the wavelength of the output beam of an optical transmitter, it is common that the transmitter is provided with means for detecting the output wavelength. The value of the detected output wavelength can be used, e.g., by the external system host as information for preventing various system failures. In order to enable this, it is common practice that the optical transmitter supplies information about the output wavelength to the system host or other external devices, as necessary. The means for detecting the output wavelength (hereinafter also referred to as the "wavelength detecting system" for convenience) has been implemented in various practical forms. Generally, a wavelength detecting system includes various types of components for monitoring the output beam of the optical transmitter, such as beam splitters, optical filters, and photodetectors, for example.

In some practical applications it is necessary to correct the output wavelength value detected by the wavelength detecting system. This is because some error is inevitably introduced during the detection process in which the sampled light is processed and measured by the components of the wavelength detecting system. The correction calculation involved complicates the control of the optical transmitter. This problem is especially acute with wavelength detecting systems using an etalon, since etalons have complicated wavelength transmission characteristics. Thus, wavelength detecting systems using an etalon require a complicated correction computation.

SUMMARY OF THE INVENTION

The present invention has been made to solve the above problems. It is, therefore, an object of the present invention to provide an optical transmission device having a function to determine the current wavelength value of its output beam without resorting to complicated calculation and to send it to an external device.

According to the first aspect of the present invention, an optical transmission device includes an optical transmitter, detecting means, control value selecting means, wavelength control means, associated wavelength storing means, and informing means. The optical transmitter outputs an optical signal in accordance with an input signal. The detecting means detects a physical quantity related to the wavelength of an output beam of the optical transmitter. The control value selecting means stores a group of predetermined control values and selects a control value from the control value group based on the physical quantity detected by the detecting means. The wavelength control means controls the wavelength of the output beam of the optical transmitter in accordance with the control value selected by the control value selecting means. The associated wavelength storing means stores associated wavelength information. The associated wavelength information specify the relationship between the control values in the control value group and the associated wavelengths. Each of the associated wavelengths is the wavelength of the output beam of the optical transmitter at a respective one of the control values under the control of the wavelength control means. The informing means is capable of informing an external device of the wavelength associated with the control value selected by the control value selecting means, the wavelength being included in the associated wavelength information.

According to the second aspect of the present invention, an optical transmission device includes an optical transmitter, a wavelength detecting system, a storage unit, a control value selecting unit, a signal conversion unit, an associated wavelength storing unit, and an output interface. The optical transmitter includes a modulating section for outputting an optical signal in accordance with a first input signal and a wavelength varying section for varying the wavelength of an output beam of the optical transmitter in accordance with a second input signal. The wavelength detecting system includes an etalon, a first photodetector, a second photodetector, a first beam splitter, a second beam splitter, and a detecting unit. The first beam splitter introduces a portion of the output beam of the optical transmitter into the first photodetector through the etalon, and the second beam splitter introduces a portion of the output beam into the second photodetector without passage through the etalon. The detecting unit detects the wavelength of the output beam of the optical transmitter based on comparison between an output from the first photodetector and an output from the second photodetector. The storage unit stores a control value table. The control value table lists a plurality of discrete control values associated with wavelengths detected by the wavelength detecting system. The control value selecting unit selects a control value from the control value table based on a wavelength detected by the wavelength detecting system. The signal conversion unit converts the control value selected by the selecting unit into the second input signal, the second input signal being input to the wavelength varying section. The associated wavelength storing unit stores an associated wavelength table or an associated wavelength function. The associated wavelength table specifys the relationship between the control values in the control value table and the associated wavelengths, and each associated wavelength is the wavelength of the output beam of the optical transmitter at a respective one of the control values when the respective one of the control values is converted into the second input signal and then input to the wavelength varying section. The associated wavelength function is a mathematical expression that expresses the relationship between the control values and the associated wavelengths and includes a variable having the control values. The output interface is capable of informing an external device of the wavelength associated with the control value selected by the control value selecting unit. The wavelength is obtained using the associated wavelength table or the associated wavelength function.

Other and further objects, features and advantages of the invention will appear more fully from the following description.

DETAILED DESCRIPTION OF THE PREFERRED EMBODIMENTS

First Embodiment

[Configuration of First Embodiment]

Figure 1:
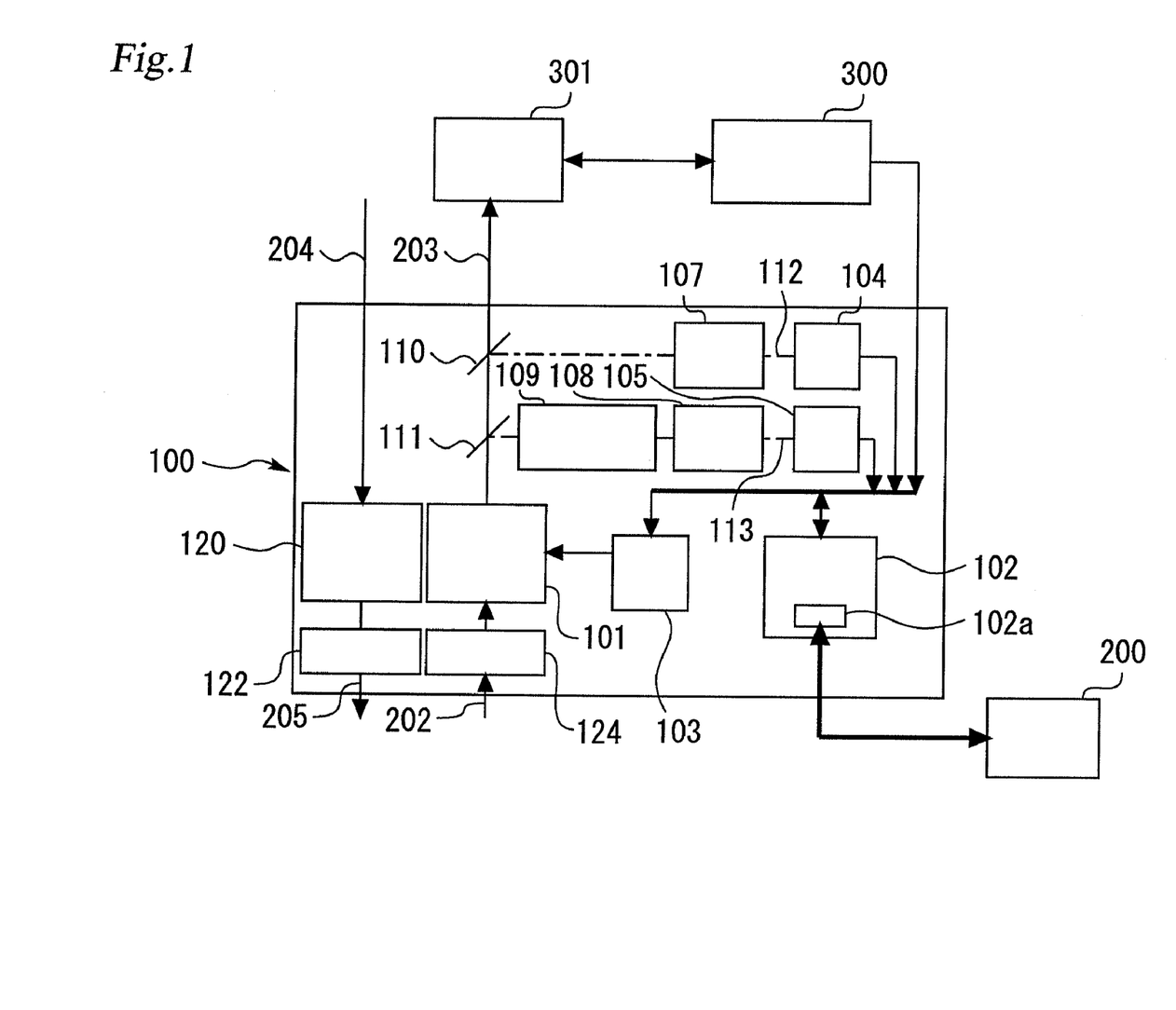
FIG. 1 is a diagram showing the configurations of an optical transceiver and its peripheral devices according to a first embodiment of the present invention.

FIG. 1 is a diagram showing the configurations of an optical transceiver 100 and its peripheral devices according to a first embodiment of the present invention. The optical transceiver 100 of the present embodiment includes a monitoring function to monitor the wavelength of its output beam. In this optical transceiver 100, the monitor signal is fed back to the control unit to feedback control the wavelength of the output beam. Such a control is referred to as "wavelength locking control."

Referring to FIG. 1, the optical transceiver 100 has a function to convert an input electrical signal 202 to an output beam 203 (an optical signal), and convert an optical signal 204 to an output electrical signal 205.

In FIG. 1, reference numeral 101 denotes an optical transmitter whose transmission wavelength is variable. According to the present embodiment, the optical transmitter 101 is not limited to any particular configuration. Generally, an optical transmitter includes optical modulation means (hereinafter also referred to as "modulating section") and wavelength control means (hereinafter also referred to as "wavelength varying section"). Specifically, it is common for an optical transmitter to include a semiconductor laser diode and an optical modulator for modulating the beam emitted from the semiconductor laser diode. In this case, the modulation section is constituted by the optical modulator, and the wavelength varying section is constituted by the means for adjusting the various electrical variables that are applied as biases to the semiconductor laser diode. It will be noted that the optical transmitter 101 may be a so-called TOSA (Transmitter Optical Subassembly).

The optical transmitter 101 varies the wavelength of its output beam 203 in accordance with the setting of a DAC (Digital to Analog Converter) 103. For convenience, the following description of the present embodiment assumes that the optical transmitter 101 can adjust its output wavelength to only one wavelength. It should be noted that an eighth embodiment of the present invention (described later) relates to a so-called "tunable" optical transceiver, which can transmit and receive on a plurality of wavelengths one at a time. In FIG. 1, reference numeral 120 denotes an optical receiver.

The optical transceiver 100 includes a receiving circuit 122 and a transmitting circuit 124. The receiving circuit 122 converts the output from the optical receiver 120 into the output electrical signal 205. The transmitting circuit 124, on the other hand, inputs the electrical signal 202 to the optical transmitter 101. This input electrical signal 202 is converted into an optical signal.

Reference numeral 102 denotes a microcontroller which controls the DAC 103 and ADCs (Analog to Digital Converters) 104 and 105. The microcontroller 102 also communicates with a system host 200, e.g., sends information about the output wavelength to the system host 200 in order to maintain system reliability. The microcontroller 102 includes a hardware/software interface 102a for such communication.

The optical transceiver 100 achieves its monitoring function of monitoring the wavelength of its output beam in the following manner. The optical transceiver 100 includes beam splitters 110 and 111 which split the output beam 203 from the optical transmitter 101. According to the present embodiment, the optical transceiver 100 includes PDs (Photo Detectors) 107 and 108 serving as monitoring photodetectors. The PDs 107 and 108 are implemented by photoelectric conversion devices such as semiconductor photodiodes. The split beams reflected from the beam splitters 110 and 111 enter the PD 107 and a wavelength filter 109, respectively. According to the present embodiment, the wavelength filter 109 is an etalon.

The beam which has passed through the wavelength filter 109 enters the PD 108. The PDs 107 and 108 output electrical signals (namely, intensity signals 112 and 113, respectively) corresponding to the intensities of the beams they receive. The intensity signals 112 and 113 are input to the ADCs 104 and 105, respectively, which analog-to-digital convert these signals, thus digitizing the intensities of the beams input to the PDs 107 and 108. It should be noted that the beam input to the PD 108 is the filtered output beam from the wavelength filter 109.

The optical transmissivity of the wavelength filter 109 varies with the wavelength of the input beam. Taking advantage of this characteristic of the wavelength filter 109, the wavelength of the output beam 203 can be estimated by comparing the intensity signals 112 and 113.

The DAC 103 supplies an analog signal to the optical transmitter 101 so that the transmitter operates in an optimal state. At that time, the microcontroller 102 supplies a DAC control value (hereinafter also referred to simply as a control value) to the DAC 103. That is, the DAC 103 controls the optical transmitter 101 in response to the received DAC control value. Generally, the DAC control value supplied from the microcontroller 102 is such that when the measured wavelength is shorter than the target wavelength the wavelength of the output beam of the optical transmitter 101 is increased, and that when the measured wavelength is longer than the target wavelength the wavelength of the output beam is decreased.

According to the present embodiment, the microcontroller 102 is designed to supply only one of a finite number n of DAC control values DA0 to DAn to the optical transmitter 101. Specifically, these DAC control values DA0 to DAn may be determined as follows. Let it be assumed that the output of the ADC 105, which receives the beam that has passed through the wavelength filter 109 (an etalon), is limited to 8 values (namely, 3-bit values). That is, the lowest output value from the ADC 105 is 0. It is further assumed that the shorter the wavelength of the beam received by the ADC 105, the lower the output from the ADC 105. Further, the highest output value from the ADC 105 is 7, and the middle output values are 1, 2, ..., 6. These 8 output values 0 to 7 are assigned to 8 control values DA0 to DA7, respectively, meaning that these DAC control values are represented by the 3-bit digital value output from the ADC 105. Although the above example uses 3-bit values to represent DAC control values, any number of bits may be used. It should be noted that in the following description the letter n represents an integer.

Referring still to FIG. 1, a wavelength meter 301 and a test system 300 are used to adjust and test the optical transceiver 100. They are connected to the optical transceiver 100, as necessary. The wavelength of the output beam 203 is measured by the wavelength meter 301, and the measurement result is fed back to memory in the microcontroller 102, etc. through the test system 300. This makes it possible to optimize the operating state of the optical transceiver 100, as well as to test its operation.

[Operation and Detailed Processing of First Embodiment]

Figure 2:
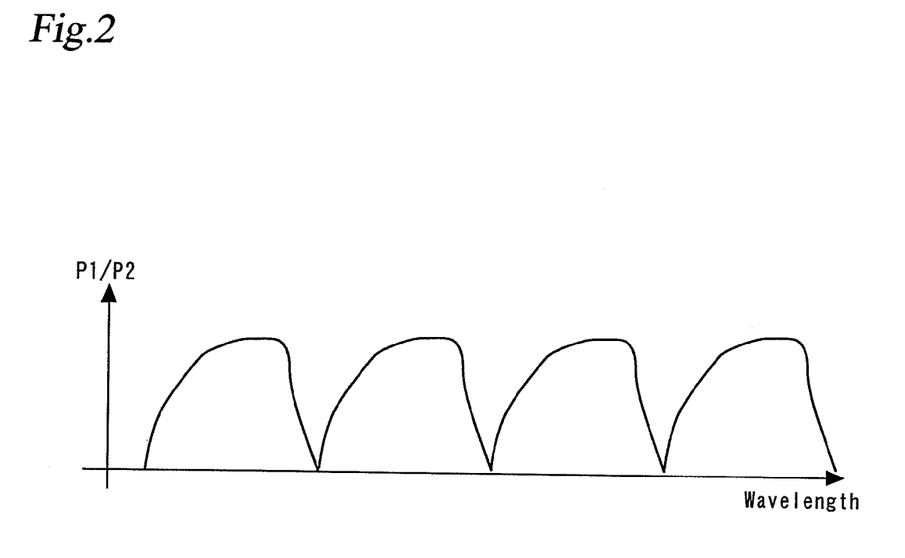
FIG. 2 is a diagram illustrating the wavelength dependence of the optical transmissivity of an etalon.

According to the present embodiment, the intensity signal 113, which is output from the PD 108 and corresponds to the intensity of the output beam from the wavelength filter 109, is compared with the intensity signal 112, which is output from the PD 107 and corresponds to the intensity of the reflected split beam directly input to the PD 107, in order to measure and monitor the wavelength of the output beam 203 of the optical transmitter 101. FIG. 2 is a diagram illustrating the wavelength dependence of the optical transmissivity of an etalon. In FIG. 2, the vertical axis represents P1/P2, P1 is the intensity of a beam when the beam is not through an etalon, P2 is the intensity of a beam when the beam pass through the etalon. As can be seen from FIG. 2, the optical transmissivity of the wavelength filter 109 varies with wavelength in a complicated manner.

In order to accurately determine the wavelength of the output beam 203, a calculation may be performed to compensate for the imperfect wavelength characteristics shown in FIG. 2. However, this compensation calculation is bound to be complicated since the characteristics of the etalon are complicated, as shown in FIG. 2, which might complicate the control of the optical transceiver 100. To overcome this problem, the present embodiment provides a function to measure and monitor the wavelength of the output beam 203 using a simple control.

Figure 3:
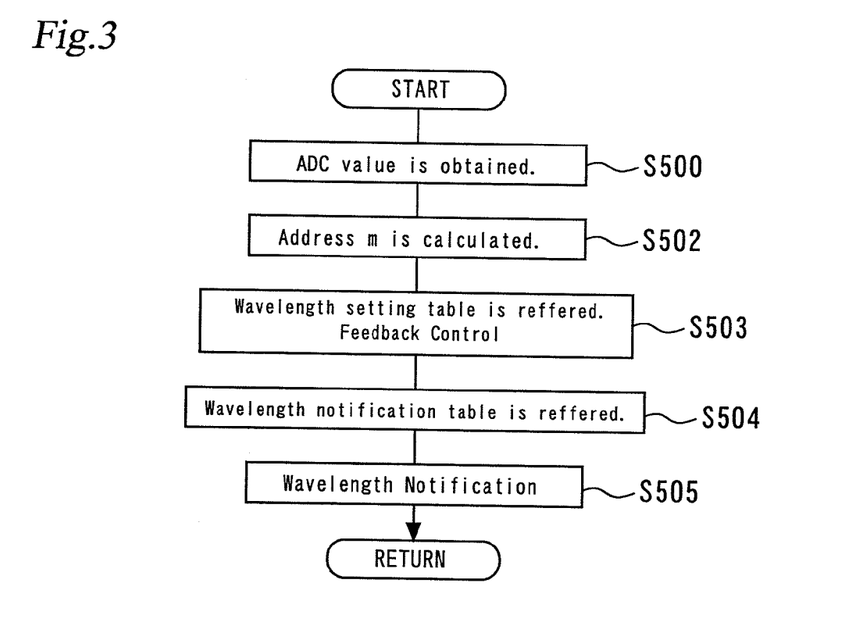
FIG. 3 is a flowchart of a routine executed by a microcontroller 102 according to the present embodiment.

FIG. 3 is a flowchart of a routine executed by the microcontroller 102 according to the present embodiment. This routine, illustrated by the flowchart of FIG. 3, includes wavelength control, measurement of the wavelength of the transmission beam, and supplying information about the wavelength to the system host 200.

The routine shown in FIG. 3 begins at step S500 by digitizing physical quantities related to wavelength (i.e., the outputs from the PDs 107 and 108) by use of the ADCs 104 and 105 and reading these digitized values. Specifically, according to the present embodiment, the microcontroller 102 reads the outputs from the ADC 104 and from the ADC 105. It should be noted that the input to the ADC 105 is the output from a monitor PD (namely, the PD 108) which output results from the photoelectric conversion of the beam that has been transmitted through the wavelength filter 109. The input to the ADC 104, on the other hand, is the output from a PD (namely, the PD 107) which output results from the photoelectric conversion of the split beam (or output monitor beam) directly input to the PD.

Figure 4:
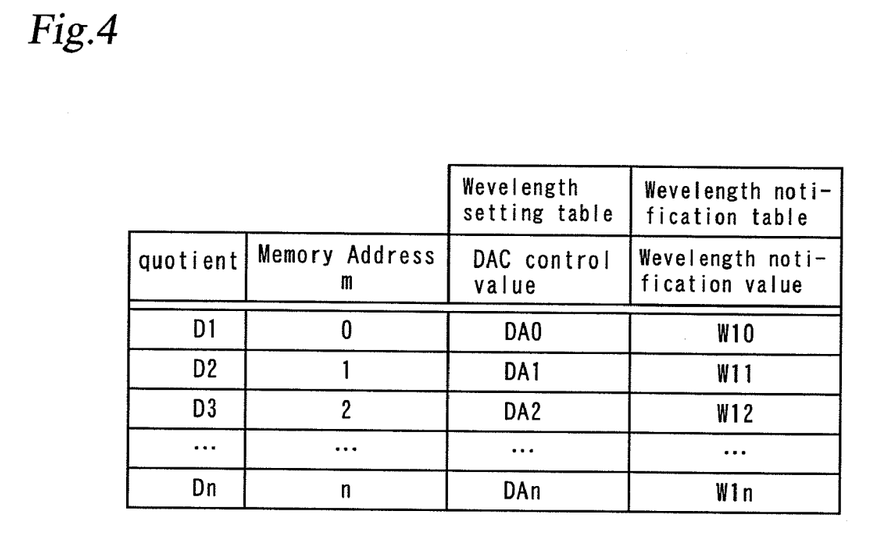
FIG. 4 shows a table, used in the first embodiment, listing DAC control values and wavelength notification values.

Next, at step S502, a reference memory address m is calculated based on the read values using the table shown in FIG. 4. The table of FIG. 4, used in the present embodiment, lists DAC control values and wavelength notification values. Specifically, this step first calculates a quotient by dividing the digital value output from the ADC 104 by the digital value output from the ADC 105. The memory address m is then determined based on this quotient without making any calculation for compensating for the imperfect characteristics of the wavelength filter 109. The list of DAC control values in the table of FIG. 4 is hereinafter also referred to as the "wavelength setting table," and the list of wavelength notification values is hereinafter also referred to as the "wavelength notification table."

Then, at step S503, a DAC control value is selected from the table of FIG. 4, and a feedback control is performed using the selected DAC control value. Specifically, for example, if the calculated memory address m is 2, then the DAC control value DA2 is selected. According to the present embodiment, the DAC control values DA0 to DAn are determined such that when the measured wavelength is shorter than the target wavelength the wavelength of the output beam of the optical transmitter 101 can be increased, and that when the measured wavelength is longer than the target wavelength the wavelength of the output beam can be decreased, as described above. This enables wavelength feedback control to be exercised.

At step S504, one of the wavelength notification values W01 to W1n is selected from the table in the memory shown in FIG. 4. Specifically, since the memory address m has been selected at step S502, the wavelength notification value W1m is selected. The selected wavelength notification value W1m is then sent to an external device at step S505.

The following describes a method of determining the wavelength notification values W10 to W1n shown in FIG. 4. Referring now to FIG. 1, the wavelength meter 301 disposed outside the optical transceiver 100 is connected and adjusted so as to be able to measure the wavelength of the output beam 203. Further, the test system 300 is connected to the wavelength meter 301 and the DAC 103 for access thereto. In this state, the wavelength of the output beam 203 is measured at each of the DAC control values DA0 to DAn. The measured wavelengths obtained at the DAC control values DA0 to DAn are designated as the wavelength values, or wavelength notification values, W10 to W1n above, respectively, and are stored. The wavelength values W10 to W1n are then rearranged into a list as shown in FIG. 4, and stored as a wavelength notification table in a memory region accessible to the microcontroller 102. This arrangement enables the microcontroller 102 to access the wavelength notification table, when necessary, as described in connection with the above step S504. The wavelength values (W10 to W1n) in the wavelength notification table are calibrated values. Therefore, it is not necessary to perform a calculation to compensate for the imperfect characteristics of the wavelength filter 109 when sending one of the wavelength values W10 to W1n to an external device, thus simplifying the control operation of the microcontroller 102.

As described above, the optical transceiver 100 of the present embodiment has a function to determine the current wavelength value of the output beam 203 of its optical transmitter 101 without resorting to complicated calculation and to send it to an external device. Specifically, in the optical transceiver 100 of the present embodiment, memory stores the wavelength notification table specifying the relationship between the DAC control values DA0 to DAn and the corresponding values of the wavelength of the output beam 203 of the optical transmitter 101. This enables the microcontroller 102 to determine the wavelength of the output beam 203 at each of the DAC control values DA0 to DAn by referring to the wavelength notification table. Therefore, when the optical transceiver 100 needs to inform an external device (or the system host 200) of the current wavelength value of its output beam, all that need be done is to first read the wavelength notification value associated with the current control value from the wavelength notification table and then send it the external device (or the system host 200). This eliminates the need for complicated calculation when informing the external device of the current wavelength value of the output beam 203. That is, the optical transceiver 100 of the present embodiment has a function to determine the current wavelength value of the output beam from its optical transmitter 101 without resorting to complicated calculation and to send it to an external device.

The present embodiment described above also implements the first aspect of the present invention described in the Summary of the Invention section. Specifically, the following should be noted: the optical transmitter 101 of the present embodiment corresponds to the optical transmitter; the input electrical signal 202, the input signal; the output beam 203, the optical signal or output beam; the PDs 107 and 108, the detecting means; and the optical intensities detected by the PDs 107 and 108, the physical quantity.

Further, the DAC control value selecting means implemented by the microcontroller 102 in the present embodiment corresponds to the control value selecting means of the first aspect of the invention, and the control value selection part of step S503 of the flowchart shown in FIG. 3 corresponds to the selecting of a control value by the control value selecting means in the first aspect. Further, the group of DAC control values DA0 to DAn of the present embodiment corresponds to the control value group of the first aspect of the invention, and each DAC control value DA0 to DAn in the present embodiment corresponds to a respective control value in the first aspect of the present invention.

Further, the wavelength control means implemented by the microcontroller 102 of the present embodiment corresponds to the wavelength control means of the first aspect of the invention, and the wavelength control part of step S503 of the flowchart shown in FIG. 3 corresponds to the controlling of the wavelength of the output beam of the optical transmitter by the wavelength control means in the first aspect. Further, the wavelength notification values W10 to W1n of the present embodiment shown in FIG. 4 correspond to the associated wavelength information of the first aspect of the invention; the microcontroller 102, which stores the table shown in FIG. 4, corresponds to the associated wavelength storing means of the first aspect; and the interface 102a of the present embodiment corresponds to the informing means of the first aspect.

The present embodiment described above also implements the second aspect of the present invention described in the Summary of the Invention section.

Specifically, the following should be noted: the optical transmitter 101 of the present embodiment corresponds to the optical transmitter of the second aspect of the invention; the input electrical signal 202, the first input signal; the output beam 203, the optical signal or output beam; and the control signal from the DAC 103, the second input signal.

Further, the wavelength filter 109, the PDs 107 and 108, the beam splitters 110 and 111, and the ADCs 104 and 105 of the present embodiment together correspond to the wavelength detecting system of the second aspect of the invention; the wavelength filter 109 corresponds to the etalon of the second aspect; the PD 108, the first photodetector; the PD 107, the second photodetector; the beam splitter 111, the first beam splitter; the beam splitter 110, the second beam splitter; and the combination of the ADCs 104 and 105 and the microcontroller 102, the detecting unit.

Further, a storage part of the microcontroller 102 of the present embodiment corresponds to the storage unit of the second aspect of the invention; each control value DA0 to DAn in the present embodiment, a respective control value in the second aspect; and the wavelength setting table, the control value table.

Further, the microcontroller 102 in the present embodiment corresponds to the control value selecting unit in the second aspect of the invention, and the control value selection part of step S503 of the flowchart shown in FIG. 3 corresponds to the selecting of a control value by the control value selecting unit in the second aspect.

Further, the DAC 103 of the present embodiment corresponds to the signal conversion unit of the second aspect of the invention; the wavelength notification table, the associated wavelength table; and the interface 102a, the output interface.

[Comparative Example to First Embodiment]

Figure 5:
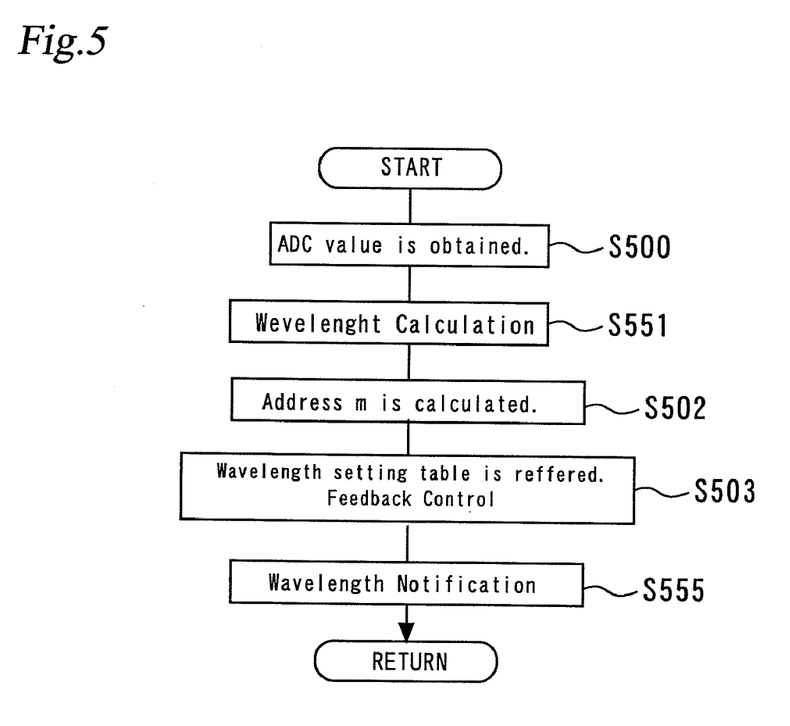
FIG. 5 is a flowchart of a routine of a comparative example.
Figure 6:
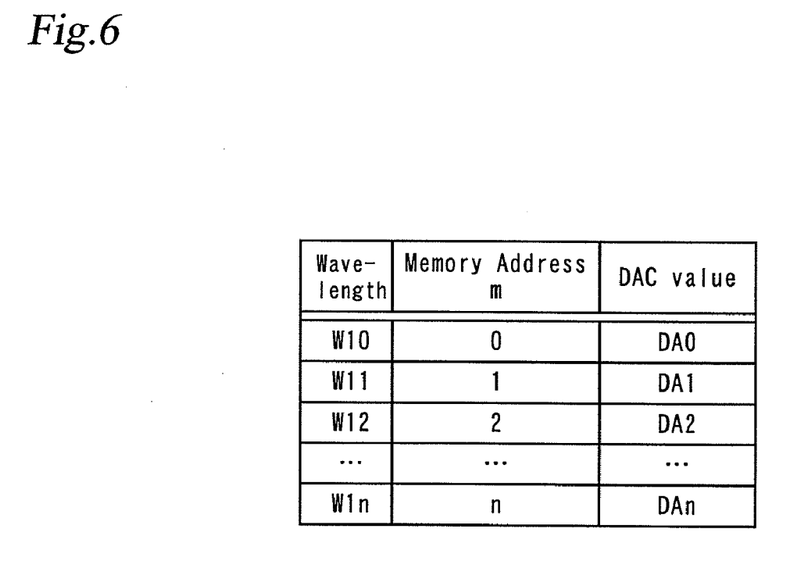
FIG. 6 is a diagram showing a table which is used in the comparative example and includes DAC control values.

A comparative example to the present embodiment will be described with reference to FIGS. 5 and 6. FIG. 5 is a flowchart of a routine executed by the microcontroller 102 according to this example. FIG. 6 is a diagram showing a table which is used in this comparative example and includes DAC control values. As in the present embodiment, the routine begins at step S500 by digitizing physical quantities related to wavelength by use of the ADCs 104 and 105 and reading these digitized values.

Next, at step S551, the wavelength of the output beam is determined based on the above digital values output from the ADCs 104 and 105. Specifically, the filter factor of the wavelength filter 109 depends on the wavelength of the input beam. That is, step S551 first calculates a quotient by dividing the digital value output from the ADC 104 by the digital value output from the ADC 105. According to this comparative example, the step then applies a correction calculation to the quotient value to compensate for the imperfect filter factor of the wavelength filter 109. The step then determines the wavelength value (W1) of the output beam 203 from the resultant value.

Then, at step S502, a memory address m is determined based on the determined wavelength value. This memory address m is used to control the transmission wavelength. Thus, in this comparative example, the imperfect wavelength characteristics of the wavelength filter 109 is first compensated for, and the memory address m is then determined based on the corrected wavelength value.

Then, at step S503, the operation of the DAC 103 is feedback controlled using the memory address m. According to this comparative example, data (a table) as shown in FIG. 6 is stored in memory and used for the feedback control. Specifically, the table stored in the memory lists wavelength values W10 to W1n. The one of these wavelength values closest to the wavelength value determined at step S551 is selected, and the memory address m associated with this closest wavelength value (W1m) is selected. Then, the DAC control value DAm indicated by this memory address m is input to the DAC 103.

Thus, in this comparative example, the imperfect wavelength characteristics of the wavelength filter 109 is first compensated for, and the memory address m is then determined based on the corrected wavelength value. According to this comparative example, the corrected wavelength value is sent to an external device at step S555.

In this comparative example, a calculation is performed to compensate for the imperfect wavelength transmission characteristics of the etalon (i.e., the wavelength filter 109), as described above. This compensation calculation is complicated, which might complicate the control operation of the optical transceiver 100. In the present embodiment, on the other hand, the memory address m can be determined without the need to compensate for the imperfect wavelength characteristics of the wavelength filter 109. The reason for this is that the wavelength notification table includes wavelength notification data (i.e., wavelength notifications values) at selected DAC control values. Therefore, when the optical transceiver 100 needs to inform an external device of the current wavelength value of the output beam of its optical transmitter, all that need be done is to read the wavelength value associated with the current DAC control value from the wavelength notification table. This arrangement eliminates the need for a complicated compensation calculation such as that described in connection with the comparative example.

Shown below is an exemplary equation used in the compensation calculation. In this equation (which gives the transmission spectrum), a represents the internal loss, T represents the transmissivity of the end faces of the resonator. As can be seen from this equation, the compensation calculation for the etalon is too complicated for an inexpensive microcontroller to handle.

$$I = \frac{T^2 \eta e^{-\alpha L}}{(1 - R^2 e^{-\alpha L})^2 + 4 R e^{-\alpha L} \sin^2 \left[\frac{2\eta n L}{\lambda}\right]}$$

[Variations of First Embodiment]

In the optical transceiver of the present embodiment, the microcontroller 102 stores in table form the information (namely, wavelength values, etc.) used to inform an external device of the current wavelength value f the output beam of the optical transmitter. However, the present invention is not limited to this particular arrangement. The microcontroller 102 may store a mathematical expression for giving the above information for wavelength value notification, as described later in connection with an eleventh embodiment of the present invention.

The present embodiment has been described in connection with the optical transceiver 100 including both the optical transmitter 101 and the optical receiver 120. This optical transceiver includes a wavelength notification table from which the transceiver selects an appropriate wavelength value when it needs to inform an external device of the current wavelength value of the output beam from its optical transmitter 101. However, the present invention is not limited to this particular type of device, but may be applied to optical transmission devices (i.e., devices including only an optical transmitter).

The optical transceiver of the present embodiment includes the wavelength notification table to eliminate the need for compensating for the imperfect characteristics of the wavelength filter 109. However, the present invention may be applied to optical transmission devices that have a built-in calculation function to compensate for the imperfect characteristics of the optical filter 109. That is, the invention also allows optical transmission devices with such a calculation function to have a function to inform an external device of the current wavelength value of the output beam from the optical transmitter by use of a wavelength notification table.

Second Embodiment

A second embodiment of the present invention differs from the first embodiment in that the control values DA0 to DAn are weighted (so to speak), as described below. Specifically, the spacing between each two adjacent control values in the wavelength setting table is increased as the wavelength values associated with these control values are further away from the target wavelength.

According to the first embodiment, the control values DA0 to DAn are determined such that when the measured wavelength (W1) of the output beam from the optical transmitter is shorter than the target wavelength the wavelength of the output beam can be increased, and that when the measured wavelength (W1) of the output beam is longer than the target wavelength the wavelength of the output beam can be decreased.

According to the second embodiment, in order to reduce the convergence time of the wavelength control, these DAC control values DA0 to DAn are determined such that the wavelength values associated with the DAC control values DAt ($0 \leq t \leq n$) satisfy the following relationship where Wlt is the target wavelength value and t represents the memory address.

$$(Wl1 - Wl0) \geq (Wl2 - Wl1) \geq (Wl3 - Wl2) \geq \ldots (Wlt - Wlt-1)$$

$$(Wlt+1 - Wlt) \leq (Wlt+2 - Wlt+1) \leq \ldots \leq (Wlt - Wlt-1)$$

This results in the amount of change in the wavelength of the output beam due to the wavelength control becoming small when output wavelength is near the target wavelength and, on the other hand, becoming large when output wavelength is far from the target wavelength.

Third Embodiment

As compared to the first embodiment, a third embodiment of the present invention is characterized in that the wavelength setting table includes a value used to disable the optical output of the optical transmitter when the wavelength value of the output beam is monitored to be out of a predetermined range. That is, the optical signal output of the optical transceiver 100 is interrupted when the wavelength of the output beam is monitored to be not within an expected range, i.e., when it is of abnormal value. Specifically, the optical output is shut down when the difference between the target wavelength value and the set wavelength or the wavelength value to be sent to an external device becomes excessive. (This wavelength difference is hereinafter also referred to as the "wavelength disparity" for convenience). To achieve this, when the amount of wavelength disparity exceeds a predetermined threshold value, a value (e.g., a DAC control value of 0) is set in the wavelength setting table to indicate that the optical output be shut down. With this arrangement, the transmission of light of an unwanted wavelength can be prevented, thereby preventing system failure.

Fourth Embodiment

Figure 7:
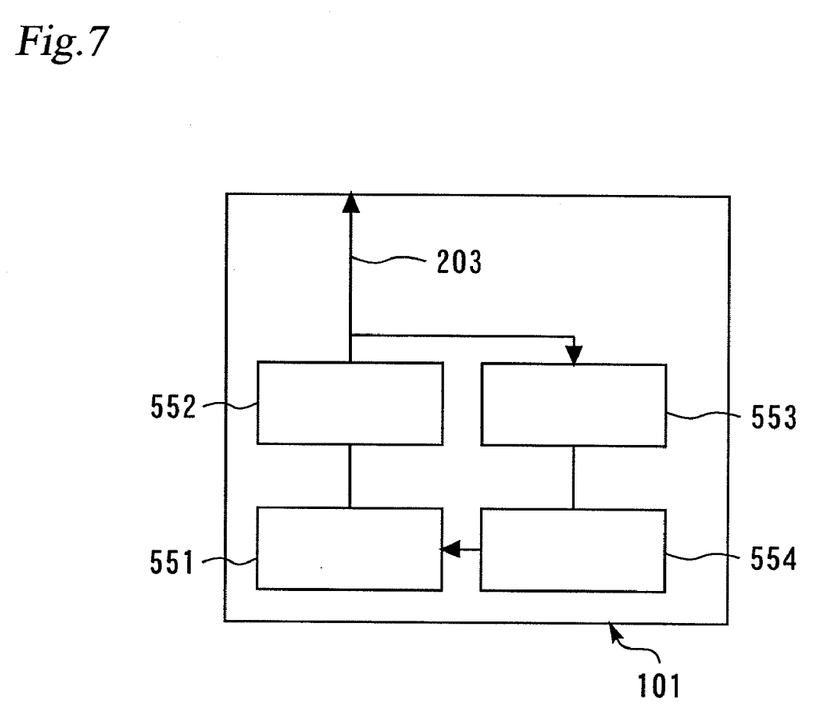
FIG. 7 is a diagram schematically showing the configuration of a fourth embodiment of the present invention.

FIG. 7 is a diagram schematically showing the configuration according to a fourth embodiment of the present invention. The configuration of the present embodiment is substantially similar in configuration to that of the first embodiment, except for the features described below with reference to FIG. 7. Referring to FIG. 7, an output light source 551 serves as a light source in the optical transmitter 101. An optical amplifier 552 amplifies the output beam from the output light source 551. An output beam monitoring circuit 553 corresponds to the combination of the wavelength filter 109, the PDs 107 and 108, and the ADCs 104 and 105 of the first embodiment. Further, an output control circuit 554 corresponds to the combination of the microcontroller 102 and the DAC 103.

According to the present embodiment, the optical amplifier 552 is controlled such that the optical output of the optical transmitter is interrupted when the wavelength value of the output beam is monitored to be out of a predetermined range. To achieve this, the wavelength setting table of the present embodiment additionally includes an output interrupt flag. This flag is set to "ON" when the difference between the target wavelength value and the set wavelength or the wavelength value to be sent to an external device exceeds a predetermined threshold value. The microcontroller 102 shuts down the optical amplifier 552 shown in FIG. 7 (or reduces its gain to zero or substantially zero) when the flag is set to, e.g., "1" indicating that the optical output be interrupted. This achieves the same advantages as described above in connection with the third embodiment.

Fifth Embodiment

A fifth embodiment of the present invention also includes a configuration as shown in FIG. 7 described in connection with the fourth embodiment. According to the present embodiment, the optical output control circuit 554 is controlled such that the optical output of the optical transmitter is interrupted when the wavelength value of the output beam is monitored to be out of a predetermined range. To achieve this, the wavelength setting table of the present embodiment additionally includes an output interrupt flag, as in the fourth embodiment. This flag is set to "ON" when the difference between the target wavelength value and the set wavelength or the wavelength value to be sent to an external device exceeds a predetermined threshold value. The microcontroller 102 turns off the operation of the output control circuit 554 shown in FIG. 7 when the flag is set to, e.g., "1" indicating that the optical output be interrupted. This achieves the same advantages as described above in connection with the third embodiment.

Sixth Embodiment

An optical transceiver 100 of a sixth embodiment of the present invention informs the host of a failure when the wavelength of its output beam is monitored to be out of a predetermined range. This is accomplished by sending an alarm signal to the host, indicating that the output wavelength is abnormal. Specifically, when the difference between the target wavelength value and the set wavelength or the wavelength value to be sent to the system host 200 exceeds a predetermined threshold value, the optical transceiver 100 sends an alarm signal, e.g., an interrupt signal, etc. to the system host 200 to inform it that the output wavelength is abnormal. This facilitates the failure management of the optical transmission system, thus improving the transmission quality.

Seventh Embodiment

An optical transceiver 100 of a seventh embodiment of the present invention informs the host of a failure when the wavelength of its output beam is monitored to be out of a predetermined range. The optical transceiver 100 accomplishes this by setting a flag in a particular address indicating to the host that the output wavelength is abnormal. Specifically, when the difference between the target wavelength value and the set wavelength or the wavelength value to be sent to the host exceeds a predetermined threshold value, the optical transceiver 100 sets a failure flag in a particular address in a register used for serial communications with the system host 200, thereby informing that the output wavelength is abnormal. This facilitates the failure management of the optical transmission system, thus improving the transmission quality.

Eighth Embodiment

According to an eighth embodiment of the present invention, the technique described in connection with the first embodiment is applied to a tunable optical transceiver which can be set, or tuned, to a plurality of wavelengths. This tunable optical transceiver includes as many wavelength setting tables and as many wavelength notification tables as there are wavelengths to which the optical transmitter in the tunable optical transceiver can be tuned. The tunable optical transceiver selects one of the wavelength setting tables and one of the wavelength notification tables suitable for the wavelength to which the optical transmitter is set.

Figure 8:
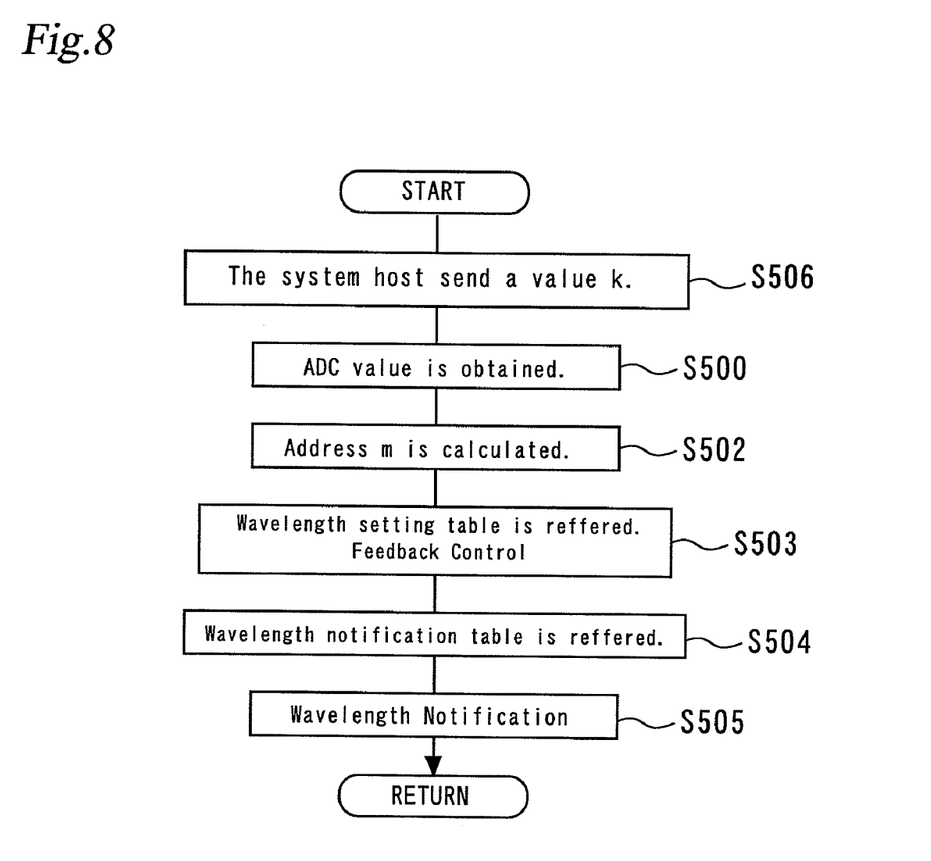
FIG. 8 is a flowchart of a routine executed by the microcontroller 102 in a tunable optical transceiver of a eighth embodiment.

The optical transceiver of the first embodiment is designed to be set to only one wavelength. However, the idea of the first embodiment may be applied to tunable optical transceivers which can be set to a plurality of wavelengths. FIG. 8 is a flowchart of a routine executed by the microcontroller 102 in the tunable optical transceiver of the present embodiment. The routine begins at step S506 by receiving from the system host 200 a value k for the wavelength of the beam to be output from the optical transceiver 100. This wavelength value k can be sent from the system host 200 to the optical transceiver 100 through serial communications using I2C, etc.

Figure 9:
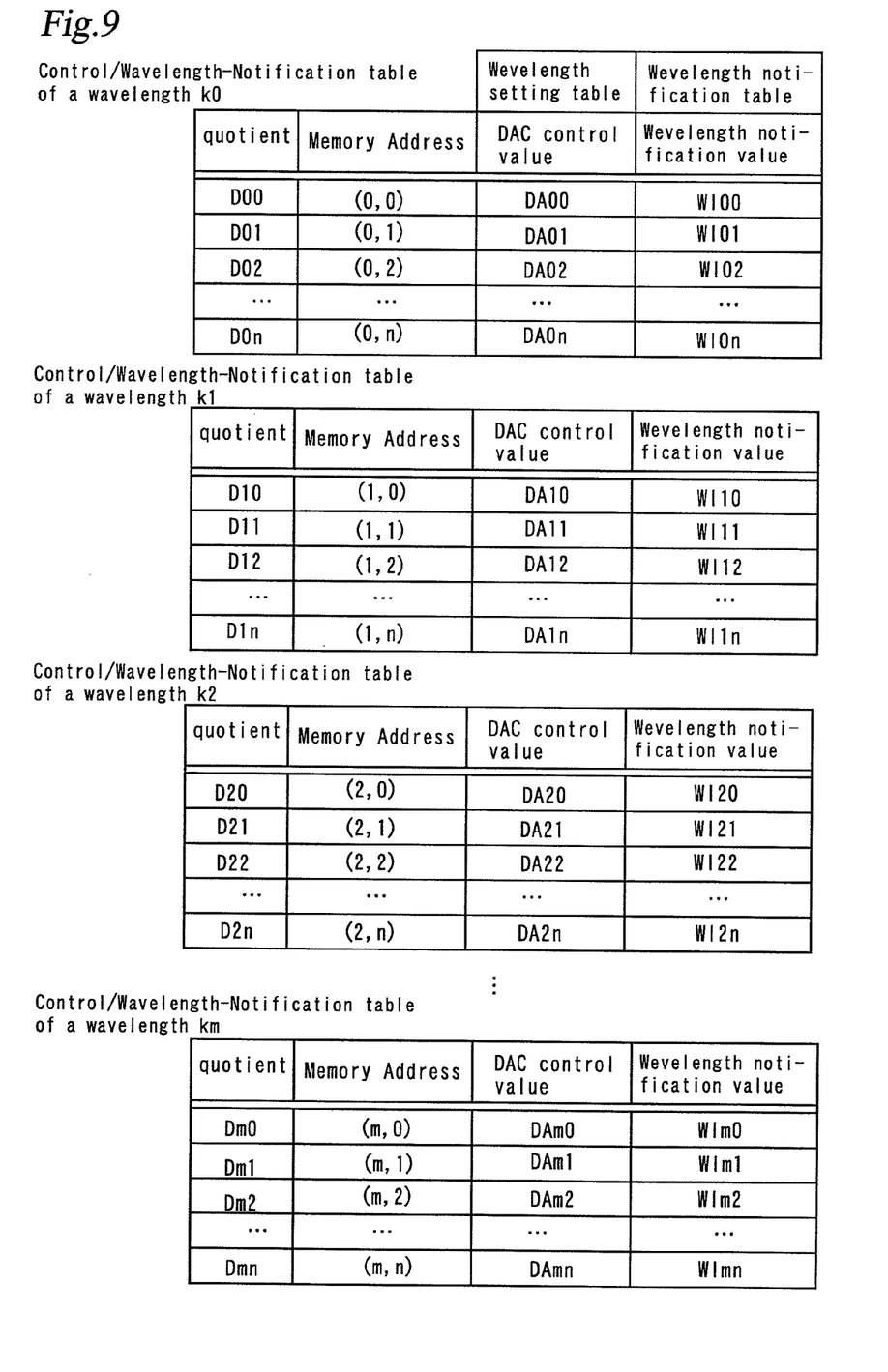
FIG. 9 is a diagram showing tables listing DAC control values and wavelength notification values, each table being created for a different wavelength, in the eighth embodiment.

FIG. 9 is a diagram showing tables listing DAC control values and wavelength notification values, each table being created for a different wavelength and referenced by the microcontroller 102 in the present embodiment. Specifically, a memory of the microcontroller 102 stores a control value table and a wavelength notification table for each of set wavelengths k0 to km, as shown in FIG. 9. Upon receiving the wavelength value k (k0≦k≦km) from the system host 200, the microcontroller 102 reads the control value table and the wavelength notification table for the wavelength from the memory.

The subsequent control steps are the same as in the first embodiment. That is, the routine includes the following processing steps: reading the values output from the ADCs (step S500); determining a memory address based on the read values (step S502); checking the wavelength setting table to determine the DAC control value for the wavelength control (step S503); and checking the wavelength notification table to determine the wavelength value to be sent to the host (step S504).

The present embodiment, like the first embodiment, is advantageous in that there is no need for compensating for the imperfect characteristics of the wavelength filter 109, thus simplifying the control of the optical transceiver. Especially, the output beam of tunable optical transceivers can be set to a plurality of different wavelengths one at a time, and is tuned from one wavelength to another as necessary (e.g., in response to an external command from the system host 200).

When a tunable optical transceiver is tuned from one wavelength to another, the calculation for compensating for the imperfect characteristics of a wavelength filter may need be changed so that it matches the new wavelength. Furthermore, this may further complicate the compensation calculation itself. The result is that the control operation of the microcontroller 102 is further complicated. On the other hand, the technique of the present embodiment allows the current value of the output wavelength of the optical transmitter to be extremely easily determined and sent to the host, as compared to when performing a complicated calculation for compensating for the imperfect characteristics of the wavelength filter 109.

Ninth Embodiment

An optical transceiver 100 of a ninth embodiment of the present invention differs from, e.g., the optical transceiver of the first embodiment in that it additionally has a function to correct the values in the wavelength setting table so as to accommodate the dependence of the DAC control value on the operating temperature of the optical transceiver 100. That is, the output wavelength vs the DAC control value characteristic of the optical transceiver 100 varies with the internal temperature of the optical transceiver 100. Therefore, according to the present embodiment, the optical transceiver 100 is provided with a capability to compensate for this change.

Specifically, the optical transceiver 100 of the present embodiment includes a correction value table used to correct the values in the wavelength setting table (which is similar to those described in connection with the first and seventh embodiment). This correction value table is prepared based on the relationship between the internal temperature of the optical transceiver 100 and the DAC control value and stored in the microcontroller 102. The microcontroller 102 corrects each value in the wavelength setting table based on the correction value table in accordance with the internal temperature of the optical transceiver 100 and applies the resultant value to the DAC 103, thereby improving the communication quality.

Tenth Embodiment

An optical transceiver 100 of a tenth embodiment of the present invention differs from, e.g., the optical transceiver of the first embodiment in that it additionally has a function to correct the values in the wavelength setting table so as to accommodate the dependence of the DAC control value on the operating time of the optical transceiver 100. That is, the difference between the intended and actual amounts of control at each DAC control value increases with the operating time of the optical transmitter 101. (This phenomenon may be referred to as "degradation over time.") Therefore, according to the present embodiment, the optical transceiver 100 is provided with a capability to compensate for this difference (or degradation over time) due to the operation of the optical transmitter 101.

Specifically, the optical transceiver 100 of the present embodiment includes a correction value table used to correct the values in the wavelength setting table (which is similar to those described in connection with the first and eighth embodiments). This correction value table is prepared based on the relationship between the operating time of the optical transmitter 101 and the actual amount of control at each DAC control value and is stored in the microcontroller 102. The microcontroller 102 corrects each value in the wavelength setting table based on the correction value table in accordance with the operating time of the optical transmitter 101 and applies the resultant value to the DAC 103, thereby improving the communication quality.

Eleventh Embodiment

An optical transceiver 100 of an eleventh embodiment of the present invention, like the optical transceiver of the first embodiment, includes a wavelength setting table, an optical transmitter 101, and components for monitoring the wavelength of the output beam of the optical transmitter 101. However, this optical transceiver 100 uses a different method of determining the wavelength value of the output beam to be sent to the host.

In the first to tenth embodiments, the optical transceiver includes a wavelength notification table listing actual measured values of the wavelength of its output beam. When the optical transceiver needs to inform the system host 200 of the current wavelength value of its output beam, the transceiver sends an appropriate one of these measured values to the host without measuring the current wavelength value, as described above with reference to the first embodiment and FIG. 6. In the present embodiment, on the other hand, the optical transceiver does not include the wavelength notification table, but uses the data of a wavelength setting table in the following manner to achieve the above-described wavelength notification function.

In the first embodiment, the wavelength notification table lists wavelength values Wl0, Wl1, ..., Wln measured by use of the wavelength meter 301. Further, the control values DA0, DA1, ..., DAn listed in the wavelength setting table are arbitrary.

In the present embodiment, on the other hand, the data in the wavelength notification table is made up of equally spaced wavelength notification values. The spacing of these wavelength values is represented by x. Further, the control values at which these wavelength values are obtained are respectively represented by DA0', DA1', ..., DAn'. That is, the wavelength values listed in the wavelength notification table are represented by the expression: Wl0+mx, where m is the memory address and Wl0 is the wavelength value at memory address 0.

The following table shows the relationship between DAC control values and the corresponding wavelength notification values. It should be noted that [m] corresponds memory address, [DAC] corresponds DAC Control Value, and [Wl] corresponds Wavelength Notification Value, respectibely, in the following.

| [m] | [DAC] | [Wl] |
| --- | --- | --- |
| 0 | DA0' | Wl0 |
| 1 | DA1' | Wl0 + x |
| 2 | DA2' | Wl0 + 2x |
| 3 | DA3' | Wl0 + 3x |
| 4 | DA4' | Wl0 + 4x |
| 5 | DA5' | Wl0 + 5x |
| 6 | DA6' | Wl0 + 6x |
| 7 | DA7' | Wl0 + 7x |

As a result, the wavelength value to be sent to the host can be determined from the control value input to the DAC 103 using the above expression where memory address m is a variable. That is, the control value uniquely determines the wavelength value to be supplied to the host. This means that the expression Wl0+mx can be transformed into a function expression in which the control value is represented by a variable and which gives the wavelength value of the output beam. This arrangement eliminates the need for compensating for the imperfect characteristics of the wavelength filter 109 although it does not use a wavelength notification table, thus simplifying the control of the optical transceiver.

The expression Wl0+mx in the present embodiment corresponds to the associated wavelength function in the second aspect of the invention. It should be noted that the associated wavelength function of the present embodiment (i.e., Wl0+mx) can be transformed into a function in which, instead of the memory address, the control value is represented by a variable and which gives the wavelength of the output beam, as described above, since memory address m uniquely identifies the control value.

The features and advantages of the present invention may be summarized as follows:

According to one aspect of the present invention, the first aspect of the invention allows an optical transmission device to have a function to determine the current wavelength value of its output beam without resorting to complicated calculation and send it to an external device. Specifically, in this optical transmission device, the associated wavelength storing means stores associated wavelength information that specifies the relationship between each control value in a control value group and the associated wavelength value of the output beam from the optical transmitter. Therefore, when the optical transmission device needs to inform an external device of the current wavelength value of its output beam, all that need be done is to read the wavelength value associated with the current control value from the associated wavelength information and sends it to the external device. That is, the optical transmission device can determine the current wavelength value of the output beam of its optical transmitter without resorting to complicated calculation and send it to an external device. Thus, the first aspect of the invention provides a function to determine the current wavelength value of the output beam from an optical transmitter without resorting to complicated calculation and to send it to an external device.

According to the other aspect of the present invention, the second aspect of the invention allows an optical transmission device with a wavelength detecting system using an etalon to have a function to determine the current wavelength value of the output beam from its optical transmitter without resorting to complicated calculation and send it to an external device. Specifically, the optical transmissivity of an etalon varies with wavelength in a complicated manner. Therefore, the above wavelength detecting system must perform a calculation for compensating for the imperfect characteristics of the etalon in order to determine the wavelength of the output beam. In the case of prior art optical transmission devices, however, determining the wavelength with sufficient accuracy requires complicated calculation to compensate for the imperfect characteristics of the etalon. On the other hand, when the optical transmission device of the second aspect needs to inform an external device of the current wavelength value of its output beam, all that need be done is to obtain the wavelength value associated with the current control value using the associated wavelength table or the associated wavelength function and send it to the external device through the output interface. Thus, the second aspect of the invention provides a function to determine the current wavelength value of the output beam from an optical transmitter with an etalon without making any calculation for compensating for the imperfect characteristics of the etalon and to send it to an external device.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2008-321201, filed on Dec. 17, 2008 including specification, claims, drawings and summary, on which the Convention priority of the present application is based, are incorporated herein by reference in its entirety.

Temperature Notification Function of the Invention

There will now be described a temperature notification function using the technique of the first to eleventh embodiments. The output wavelength of an optical transmitter varies greatly with its internal temperature. Therefore, in order to control the wavelength of the output beam from the optical transmitter, it is important to control the internal temperature of the transmitter. It is common that the control of the temperature of an optical transmitter includes measuring the temperature. The measured temperature values can be used as information for preventing various system failures. The following description will be directed to an exemplary method of supplying an external device (or host) with temperature information using the technique of the first to eleventh embodiments.

Figure 10:
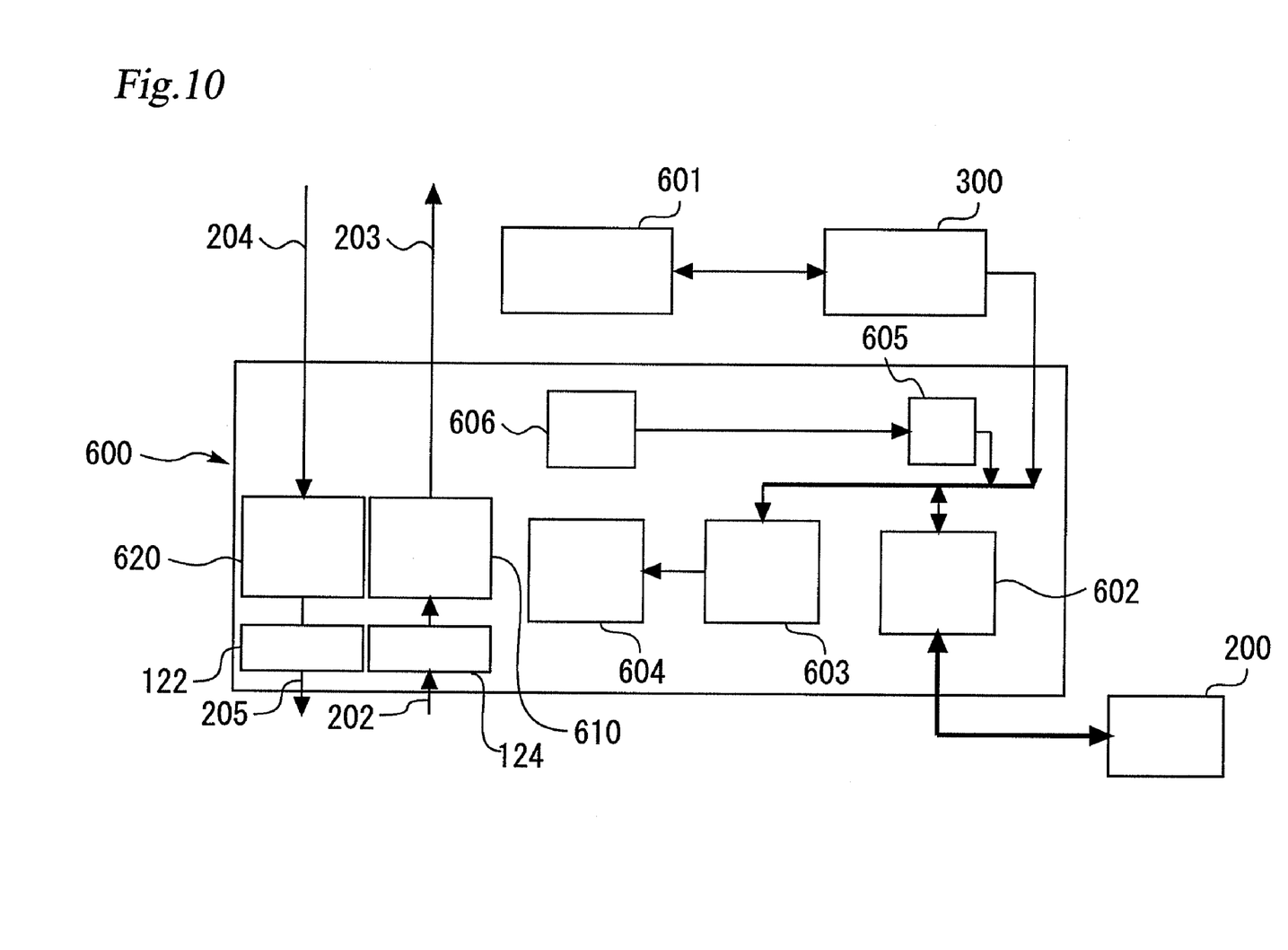
FIG. 10 is a diagram showing the configurations of an optical transceiver and peripheral devices used to illustrate a temperature notification function using the technique of the first to eleventh embodiments.

FIG. 10 is a diagram showing the configurations of an optical transceiver 600 and peripheral devices used to illustrate a temperature notification function using the technique of the first to eleventh embodiments. As shown in FIG. 10, the optical transceiver 600 includes an optical transmitter 610 and an optical receiver 620. The optical transceiver 600 also includes a microcontroller 602, a TEC control circuit 603, a thermoelectric cooler (TEC) 604, an ADC 605, and a temperature sensor 606.

The internal temperature of the optical transceiver 600 may be determined by monitoring the output from the temperature sensor 606 disposed in the optical transceiver 600, as shown in FIG. 10. However, this method has the following problem. The voltage drop in the optical transceiver 600 increases as its power consumption increases. This voltage drop affects the output from the temperature sensor 606. This means that the output from the temperature sensor 606 varies with the power consumption of the optical transceiver 600. Therefore, in order to accurately determine the internal temperature of the optical transceiver 600, it is necessary to compensate for the change in the output of the temperature sensor 606 due to the change in the power consumption of the optical transceiver 600, which might complicate the control of the optical transceiver 600.

Figure 11:
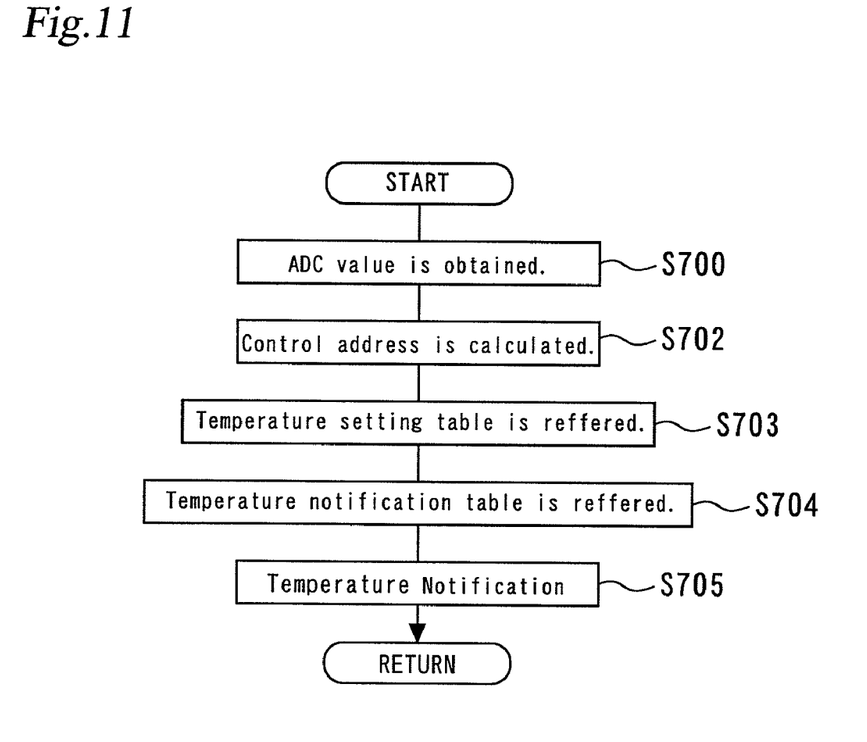
FIG. 11 is a flowchart of a routine executed by a microcontroller 602 in order to supply an external device with temperature information using the technique of the first to eleventh embodiments.

To address this problem, the exemplary method uses the technique of the first to eleventh embodiments. FIG. 11 is a flowchart of the routine executed by a microcontroller 602 in order to supply an external device with temperature information using the technique of the first to eleventh embodiments.

The routine shown in FIG. 11 begins at step S700 by measuring the internal temperature of the optical transceiver by use of the temperature sensor 606, digitizing the measured value, and then reading the digitized value.

Figure 12:
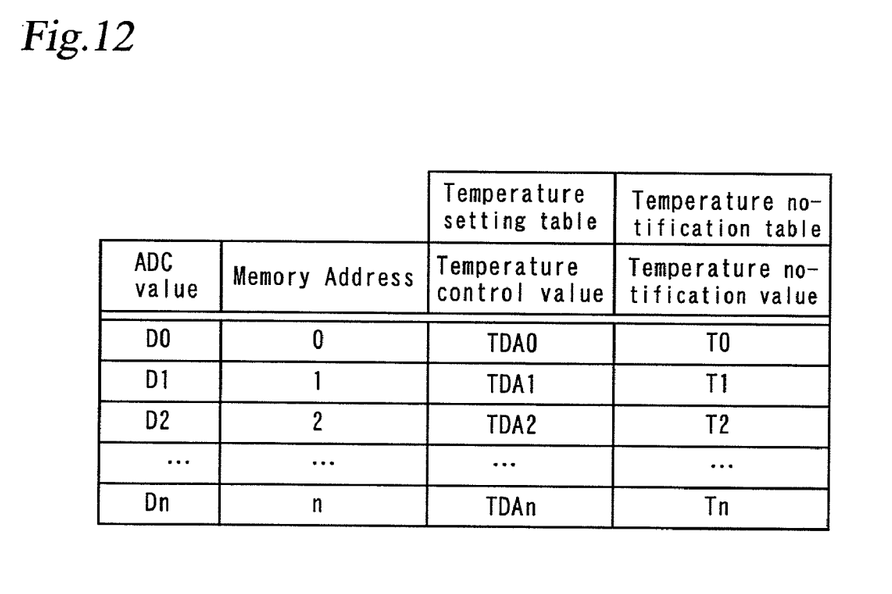
FIG. 12 shows a table listing DAC control values and temperature notification values.

Next, at step S702, a reference memory address m is calculated based on the read value using the control table shown in FIG. 12. Then at step S703, based on the calculated memory address m, a control value TDm is selected (e.g., if m=2, the control value TDA2 is selected) which is used to control the thermoelectric cooler 604. FIG. 12 is a diagram showing a table which lists TDAC control values and temperature notification values. This table is referenced by the microcontroller 102 when supplying an external device with temperature information using the technique of the first to eleventh embodiments. Referring to FIG. 12, TDAC control values TDA0 to TDAn are determined such that when the measured temperature of the optical transceiver is lower than the target temperature the temperature of the optical transceiver can be increased, and that when the measured temperature of the optical transceiver is higher than the target temperature the temperature of the optical transceiver can be decreased. This enables temperature feedback control to be exercised.

At step S704, a temperature notification value is then selected from the control table shown in FIG. 12. Specifically, the temperature notification value Tm is selected based on the address m calculated at step S702. The selected temperature notification value Tm is then sent to the system host 200 at step S705.

The following describes a method of determining the wavelength notification values T0 to Tn shown in FIG. 12. This method proceeds as follows. Referring now to FIG. 10, an external temperature sensor 601 is connected and adjusted so as to be able to measure the temperature of the optical transceiver 600. Further, a test system 300 is connected to the external temperature sensor 601 and the TEC control circuit 603 for access thereto. In this state, the temperature of the optical transceiver 600 is measured at each of the temperature control values TDA0 to TDAn. The measured temperature values obtained at the temperature control values TDA0 to TDAn are designated by T0 to Tn, respectively, and stored. The temperature values T0 to Tn are then arranged into a list as shown in FIG. 12, and stored as a temperature notification table in a memory region accessible to the microcontroller 602. This arrangement enables the microcontroller 602 to refer to the temperature notification table when necessary, as described in connection with the above step S704. Since the temperature values (T0 to Tn) in the temperature notification table are those measured by the external temperature sensor 601, it is not necessary to correct them. This simplifies the control operation of the microcontroller 602.

The technique of the eleventh embodiment may be applied to the above exemplary method, as described below. According to the above method, the temperature notification table lists measured temperature values of the optical transceiver. When the optical transceiver needs to inform the host of the current value of its temperature, the optical transceiver sends an appropriate one of these measured values to the host without measuring the current temperature value. In a variation of this method, the optical transceiver does not include the temperature notification table, but uses the same data as that listed in the table and modifies it in the following manner to simplify the control of the optical transceiver. In the above method, the temperature notification table lists the measured temperature values T0, T1, . . . , Tn. Further, the control values TDA0, TDA1, . . . , TDAn listed in the temperature setting table are arbitrary. In this variation, on the other hand, the temperature setting table lists such control values that the temperature notification values listed in the temperature notification table are equally spaced. (These control values are respectively represented by TDA0', TDA1', . . . , TDAn'.) That is, the temperature values in the temperature notification table can be represented by the expression T0+mx, where m is the memory address and T0 is the temperature value at memory address 0. This eliminates the need for a temperature notification table, thus simplifying the control of the optical transceiver.

What is claimed is:

1. An optical transmission device comprising:
an optical transmitter for outputting an output beam in accordance with an input signal;
detecting means for detecting a physical quantity related to wavelength of the output beam output by said optical transmitter;
control value selecting means for storing a group of control values and selecting a control value from the group of control values based on the physical quantity detected by said detecting means;
wavelength control means for controlling the wavelength of the output beam output by said optical transmitter in accordance with the control value selected by said control value selecting means;
associated wavelength storing means for storing associated wavelength information specifying a relationship between the control values in the group of control values and associated wavelengths, each associated wavelength being the wavelength of the output beam output by said optical transmitter at a respective one of the control values under control of said wavelength control means; and
informing means for informing an external device of the associated wavelength associated with the control value selected by said control value selecting means, the associated wavelength being included in the associated wavelength information.

2. The optical transmission device according to claim 1, wherein said detecting means includes:
an etalon; and
comparison detection means for detecting the physical quantity related to the wavelength of the output beam output by said optical transmitter by comparing a physical quantity related to a first output beam and a physical quantity related to a second output beam, the first output beam resulting from a portion of the output beam output by said optical transmitter being transmitted through said etalon to said comparison detection means, the second output beam resulting from another portion of the output beam output by said optical transmitter being transmitted to said comparison detection means without passage through said etalon.

3. The optical transmission device according to claim 1, wherein:
said optical transmitter is a tunable optical transmitter outputting an output beam for communications that can be tuned to a plurality of different set wavelengths, one wavelength at a time;
said optical transmission device further comprises set wavelength obtaining means for obtaining a currently set wavelength of the output beam output by said tunable optical transmitter;
said control value selecting means stores a plurality of groups of the control values, each group being associated with one of the set wavelengths, selects one of the plurality of group of control values that matches the currently set wavelength obtained by said set wavelength obtaining means, and selects a control value from the group of control values selected;
said associated wavelength storing means stores a plurality of the associated wavelength information, each associated wavelength information corresponding to a respective one of the set wavelengths; and
said informing means selects the one of the plurality of associated wavelength information that matches the currently set wavelength, and informs the external device of the wavelength associated with the control value selected in the associated wavelength information selected.

4. The optical transmission device according to claim 1, wherein the associated wavelength information is an associated wavelength table that includes a table of control values and a table of wavelengths.

5. The optical transmission device according to claim 1, wherein the associated wavelength information is an associated wavelength function which is represented by a mathematical expression in which control values are represented by a variable.

6. The optical transmission device according to claim 1, wherein:
said detecting means, said control value selecting means, and said wavelength control means form a feedback system for feeding back the physical quantity detected by said detecting means to said wavelength control means so that the wavelength of the output beam output by said optical transmitter coincides with a target wavelength; and
the following equations are satisfied:

$$(Wl1-Wl0) \geq (Wl2-Wl1) \geq (Wl3-Wl2) \geq \ldots (Wlt-Wlt-1), \text{ and}$$

$$(Wlt+1-Wlt) \leq (Wlt+2-Wlt+1) \leq \ldots \leq (Wlt-Wlt-1),$$

where Wlt represents the target wavelength and DAt represents control values in the group of control values for attaining the target wavelength, where t and n are integers and $0 < t < n$.

7. The optical transmission device according to claim 1, further comprising output shutdown means for, when the physical quantity detected by said detecting means is not within a predetermined range, replacing a control value in the group of control values with a command for stopping said optical transmission device from outputting an output beam.

8. The optical transmission device according to claim 1, wherein:
the group of control values includes a flag having a value that changes depending on whether the physical quantity detected by said detecting means is within a predetermined range; and
said optical transmission device further comprises optical output shutdown means for shutting down the optical output of said optical transmission device when the flag indicates that the physical quantity is not within the predetermined range.

9. The optical transmission device according to claim 1, further comprising failure informing means for, when the physical quantity detected by said detecting means is not within a predetermined range, changing a signal to be sent to the external device.

10. The optical transmission device according to claim 9, wherein:
said detecting means, said control value selecting means, and said wavelength control means form a feedback system for feeding back the physical quantity detected by said detecting means to said wavelength control means so that the wavelength of the output beam output by said optical transmitter coincides with a target wavelength; and
said failure informing means changes the signal to be sent to the external device based on comparison between the target wavelength and the wavelength associated with the control value selected by said control value selecting means, the wavelength being included in the associated wavelength information.

11. The optical transmission device according to claim 1, further comprising correcting means for correcting the associated wavelength information in accordance with operating temperature or operating time of said optical transmission device.

12. An optical transmission device comprising:
an optical transmitter including a modulating section for outputting an output beam in accordance with a first input signal and a wavelength varying section for varying wavelength of the output beam output by said optical transmitter in accordance with a second input signal;
a wavelength detecting system including an etalon, a first photodetector, a second photodetector, a first beam splitter, a second beam splitter, and a detecting unit, said first beam splitter introducing a portion of the output beam output by said optical transmitter into said first photodetector through said etalon, said second beam splitter introducing a portion of the output beam into said second photodetector without passage through said etalon, said detecting unit detecting the wavelength of the output beam output by said optical transmitter based on comparison between an output from said first photodetector and an output from said second photodetector;
a storage unit for storing a control value table listing a plurality of discrete control values associated with wavelengths detected by said wavelength detecting system;
a control value selecting unit for selecting a control value from the control value table based on a wavelength detected by said wavelength detecting system;
a signal conversion unit for converting the control value selected by said selecting unit into the second input signal, the second input signal being input to said wavelength varying section;
an associated wavelength storing unit for storing an associated wavelength table or an associated wavelength function, the associated wavelength table specifying relationship between the control values in the control value table and associated wavelengths, each associated wavelength being the wavelength of the output beam output by said optical transmitter at a respective one of the control values when the respective one of the control values is converted into the second input signal and input to said wavelength varying section, the associated wavelength function being a mathematical expression that expresses the relationship between the control values and the associated wavelengths and includes a variable using the control values; and
an output interface for informing an external device of the wavelength associated with the control value selected by said control value selecting unit, the wavelength being obtained using the associated wavelength table or the associated wavelength function.

13. The optical transmission device according to claim 12, wherein:
said optical transmitter is a tunable optical transmitter outputting an output beam for communications that can be tuned to a plurality of set wavelengths, one wavelength at a time;
said optical transmission device further comprises a set wavelength storing unit for storing the value of the currently set wavelength of said tunable optical transmitter;
said control value selecting unit stores a plurality of the control value tables, each table for a respective one of the set wavelengths, selects one of the plurality of control value tables that matches the currently set wavelength stored in said set wavelength storing unit, and selects a control value from the selected control value table based on a wavelength detected by said wavelength detecting system;
said associated wavelength storing unit stores a plurality of the associated wavelength tables, each table for a respective one of the set wavelengths, or stores a plurality of the associated wavelength functions, each function for a respective one of the set wavelengths; and said output interface selects the one of the plurality of associated wavelength tables that matches the currently set wavelength or selects the one of the plurality of associated wavelength functions that matches the currently set wavelength, and informs the external device of the wavelength associated with the control value selected by the associated wavelength table or the associated wavelength function selected.

14. The optical transmission device according to claim 2, wherein:

said optical transmitter is a tunable optical transmitter outputting an output beam for communications that can be tuned to a plurality of different set wavelengths, one wavelength at a time;

said optical transmission device further comprises set wavelength obtaining means for obtaining a currently set wavelength of the output beam output by said tunable optical transmitter;

said control value selecting means stores a plurality of groups of the control values, each group being associated with one of the set wavelengths, selects one of the plurality of group of control values that matches the currently set wavelength obtained by said set wavelength obtaining means, and selects a control value from the group of control values selected;

said associated wavelength storing means stores a plurality of the associated wavelength information, each associated wavelength information corresponding to a respective one of the set wavelengths; and said informing means selects the one of the plurality of associated wavelength information that matches the currently set wavelength, and informs the external device of the wavelength associated with the control value selected in the associated wavelength information selected.

15. The optical transmission device according to claim 14, wherein the associated wavelength information is an associated wavelength table that includes a table of control values and a table of wavelengths.

16. The optical transmission device according to claim 14, wherein the associated wavelength information is an associated wavelength function which is represented by a mathematical expression in which control values are represented by a variable.

\* \* \* \* \*